(12) United States Patent
Peltz

(10) Patent No.: US 6,302,495 B1
(45) Date of Patent: Oct. 16, 2001

(54) RAILWAY CAR BRAKING SYSTEM INCLUDING PIEZOELECTRIC PILOT VALVE AND ASSOCIATED METHODS

(75) Inventor: David Peltz, Melbourne, FL (US)

(73) Assignee: GE Harris Railway Electronics, LLC, Erie, PA (US)

( * ) Notice: Subject to any disclaimer, the term of this patent is extended or adjusted under 35 U.S.C. 154(b) by 0 days.

(21) Appl. No.: 09/326,361

(22) Filed: Jun. 4, 1999

(51) Int. Cl.$^7$ .................................................. F16K 31/02
(52) U.S. Cl. .................................. 303/16; 303/15; 303/3; 251/129.06
(58) Field of Search ............................. 303/16, 15, 3, 303/20, 2, 128–136, 7, 118.1; 251/129.06, 129.08, 129.01, 30.01; 137/625.65, 85, 487.5, 489; 310/328; 246/167 R, 182 R; 701/70, 19, 20

(56) References Cited

U.S. PATENT DOCUMENTS

| 3,921,945 | * | 11/1975 | Swaim . | |
|---|---|---|---|---|
| 4,553,723 | * | 11/1985 | Nichols et al. | 246/167 R |
| 4,582,280 | * | 4/1986 | Nichols et al. | 303/15 |
| 4,620,567 | | 11/1986 | Kurtz | 137/627.5 |
| 4,690,465 | * | 9/1987 | Takeda et al. . | |
| 4,705,323 | * | 11/1987 | Imoto et al. . | |
| 4,722,360 | * | 2/1988 | Odajima et al. . | |
| 4,740,041 | * | 4/1988 | Pannbacker . | |
| 5,054,809 | * | 10/1991 | Yamaoka et al. . | |
| 5,076,314 | | 12/1991 | Ikehata et al. | 137/82 |
| 5,148,735 | * | 9/1992 | Veletovac . | |
| 5,354,032 | * | 10/1994 | Sims et al. . | |
| 5,445,185 | * | 8/1995 | Watanabe et al. . | |
| 5,460,202 | * | 10/1995 | Hanley et al. . | |
| 5,551,765 | | 9/1996 | Sich | 303/7 |
| 5,593,134 | * | 1/1997 | Steber et al. . | |
| 5,779,218 | * | 7/1998 | Kowanz . | |
| 6,017,016 | * | 1/2000 | Jackson . | |
| 6,170,526 | * | 1/2001 | O'Neill | 251/129.06 |

FOREIGN PATENT DOCUMENTS

| 6161480 | * | 3/1986 | (JP) . |
|---|---|---|---|
| 1120496 | * | 5/1989 | (JP) . |
| 2-8570 | * | 1/1990 | (JP) . |
| 2-98023 | * | 4/1990 | (JP) . |
| 2118287 | * | 5/1990 | (JP) . |
| 4-50581 | * | 2/1992 | (JP) . |
| 4275609 | * | 10/1992 | (JP) . |
| 4277385 | * | 10/1992 | (JP) . |
| 1130266 | * | 2/1999 | (JP) . |

OTHER PUBLICATIONS

Active Control eXperts, Inc., "Piezo Valve", 1999, pp. 1–4.
Active Control eXperts, Inc., "Using the Quickpack® Actuator as a Bimorph", 1999, pp. 1–3.
Active Control eXperts, Inc., "ACX Awarded Manufacturing Contract With Landis & Staefa to Supply Piezoelectric Actuators for Pneumatic Valves", 1996, pp. 1–2.
GE Harris Railway Electronics, L.L.C., "EP$^x$ Wirefree ECP Braking", 1997, 1998, p. 1.

* cited by examiner

Primary Examiner—Douglas C. Butler
(74) Attorney, Agent, or Firm—Carl Rowold; Armstrong Teasdale LLP

(57) ABSTRACT

A railway car brake system includes a pneumatic brake cylinder and a relay valve for controlling pressure in the brake cylinder. The relay valve is responsive to a pilot pressure which is generated by a pilot valve connected to the relay valve, the pilot valve including at least one piezoelectric element. The system also includes a controller connected to the piezoelectric element to control the pilot pressure and thereby control braking. The pilot valve releases braking upon loss of power to the at least one piezoelectric element to thereby provide a failsafe release of braking. The pilot valve may also include a first piezoelectric element for controlling fluid flow from a pressure source to the relay valve, and a second piezoelectric element for controlling fluid flow from the relay valve to atmosphere.

41 Claims, 5 Drawing Sheets

RAILWAY CAR BRAKING SYSTEM INCLUDING PIEZOELECTRIC PILOT VALVE AND ASSOCIATED METHODS

FIELD OF THE INVENTION

The present invention relates to the field of railway braking systems, and, more particularly, to a railway braking system for a railcar.

BACKGROUND OF THE INVENTION

Trains are widely used to transport people and freight. Freight trains in particular may include 150 or more railcars and extend over a mile or more. Control is required for operating the railway braking system to ensure proper braking.

Compressed air is commonly used as a power source in railway braking systems because it is essentially inert and there are no associated environmental hazards. The use of electrical control devices in conjunction with such pneumatic equipment significantly improves the ability to control the compressed air and therefore improves the effectiveness of the equipment.

A typical railway braking system includes a reservoir of compressed air to supply a relay valve which controls a pneumatic brake cylinder. The relay valve, in turn, is controlled by one or more electromagnetic solenoid valves which can vent the relay valve to atmosphere or connect it to the supply reservoir.

The current state-of-the-art is to use wireless technology to control various devices within railcars and locomotives. U.S. Pat. Nos. 4,582,280 and 4,553,723 to Nichols et al., and assigned to the assignee of the present application, are seminal patents directed to a radio communication based train control system. GE Harris Railway Electronics, L.L.C. offers a radio based control system under the designation LOCOTROL® which provides coordinated distributed power and air brake control from the lead locomotive as described in the above referenced patents. Furthermore, GE Harris offers the EPx™ Direct Braking System which is an Electronically Controlled Pneumatic (ECP) brake system that uses wireless communications technology to communicate braking commands to each railcar.

Railway pneumatic braking equipment requires relatively large orifices to permit the necessary air flow while allowing reasonably low operating pressures. For pneumatic applications which require electrical flow control devices to have a coefficient of flow greater than about 1.0, the current state-of-the-art is to use one of two types of electrical control devices. The first type is a directly operated electrically controlled pneumatic device. A significant consequence of using such a device is the extremely large amount of electrical power required to directly seal such a large orifice. This is because the force of the air pressure is proportional to the square of the surface area of the orifice.

The second type of electrical control device is a pilot valve or device. A pilot valve controls a small flow of air and uses the air pressure to develop large enough forces to operate secondary pneumatic control devices, such as the relay valve. The relay valve then controls the pneumatic brake cylinder, for example. This has the advantage of providing electrical control at a reasonable cost in return for slightly slower operation.

Conventional electrical pilot control devices are usually electromagnetic solenoids which require multiple Watts of power and cannot be considered low power. For most larger air-flow applications, such as industrial plants, a power draw of multiple Watts is insignificant. However, railcars do not typically have on-board electrical power generators. The cost and logistics of generating the amount of electrical power required for conventional electrical control devices for a railway car braking system may be prohibitive.

A significant contributor to power consumption is the mitigation of an important failure mode of a freight train. This failure mode occurs when the brakes are locked in the applied position without the ability to detect this condition. This condition is commonly referred to as dragging brakes. A train car with severely dragging brakes may go unnoticed until the wheel overheats, and shatters. Electrically controlled pneumatic brake controllers can detect and warn of this situation as long as they are operating and powered. However, if the controller becomes disabled, the system on that car must release the brake cylinder pressure to avoid damage.

One potential failsafe method is to have the electrically controlled pilot valve only hold pressure when electrical power is applied. In this way, if the control system becomes disabled, the natural rest state of the brake system is the desired brake release state. This requires that electrical power must be supplied whenever brakes are applied, which can be for multiple hours. Due to the limited electrical power available in a freight car, the pilot valve must have extremely low electrical power draw.

SUMMARY OF THE INVENTION

In view of the foregoing background, it is therefore an object of the invention to provide a railway braking system having a low electrical power requirement.

Another object of the invention is to provide failsafe operation of such braking system.

These and other objects, features and advantages in accordance with the present invention are provided by a railway car brake system including a relay valve responsive to a pilot pressure which is generated by a pilot valve which, in turn, includes at least one piezoelectric element. The system also preferably includes a controller connected to the piezoelectric element to control the pilot pressure and thereby control braking. The pilot valve also preferably releases braking upon loss of power to thereby provide a failsafe release of braking.

In one embodiment, a single piezoelectric element is positioned within a valve body. The piezoelectric elements can be controlled to selectively connect the relay valve to either the pressure source or atmosphere.

In accordance with another embodiment of the invention, the pilot valve comprises a common valve body containing first and second piezoelectric elements. The common valve body comprises a first port connected to the relay valve, a second port connected to the pressure source, and a third port connected to atmosphere.

The pilot valve, in this embodiment may also comprise a fourth port connected to atmosphere and a third piezoelectric element for controlling fluid flow from within the common valve body through the fourth port to atmosphere. This third piezoelectric element also has an energized state to block fluid flow, and a de-energized state to permit fluid flow from the relay valve, through the valve body and to atmosphere to thereby provide a failsafe release of braking. Moreover, this third piezoelectric element is substantially smaller than each of the first and second piezoelectric elements so as to consume relatively less power. Accordingly, only this third piezoelectric element is energized to maintain a desired pilot pressure. Upon loss of power, this piezoelectric element causes the pilot pressure to vent to release the brakes.

In another embodiment, first and second pilot valves include respective first and second valve bodies. Each body contains a respective piezoelectric element. The first pilot valve can be a normally closed valve comprising a first port connected to the relay valve and a second port connected to the pressure source. The second pilot valve can be a normally open valve comprising a third port connected to atmosphere and a fourth port connected to the relay valve. As an alternative, the second pilot valve can be a normally closed valve comprising a third port connected to atmosphere, a fourth port connected to the relay valve, a fifth port connected to atmosphere, and a third piezoelectric element for controlling fluid flow through the fourth port to atmosphere. In this variation, only the third piezoelectric is normally energized, and provides a failsafe release upon loss of power.

The invention preferably uses bimorphic piezoelectric elements having an energized position and a de-energized position. The controller may be connected to a radio transceiver so that electrical cables need not be coupled between cars for communication. At least one pressure sensor may be connected in fluid communication with the brake cylinder for generating a pressure signal for the controller. The control system may also include a power source such as a generator and/or a battery so that no power cable would need to be coupled from car-to-car.

According to a method aspect of the invention, steps are provided for railway car braking. These steps include generating a pilot pressure using at least one piezoelectric element, and controlling pressure in at least one pneumatic brake cylinder of the railcar in response to the pilot pressure. The piezoelectric element may be contained in a pilot valve body which is opened to atmosphere upon loss of power to the piezoelectric element to thereby provide a failsafe release of braking.

Additionally, fluid flow from a pressure source to a relay valve can be controlled with a first piezoelectric element, and fluid flow from the relay valve to atmosphere can be controlled with a second piezoelectric element. The method may further include the steps of energizing the first and second piezoelectric elements to open respective fluid flows, and de-energizing the first and second piezoelectric elements to block respective fluid flows.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
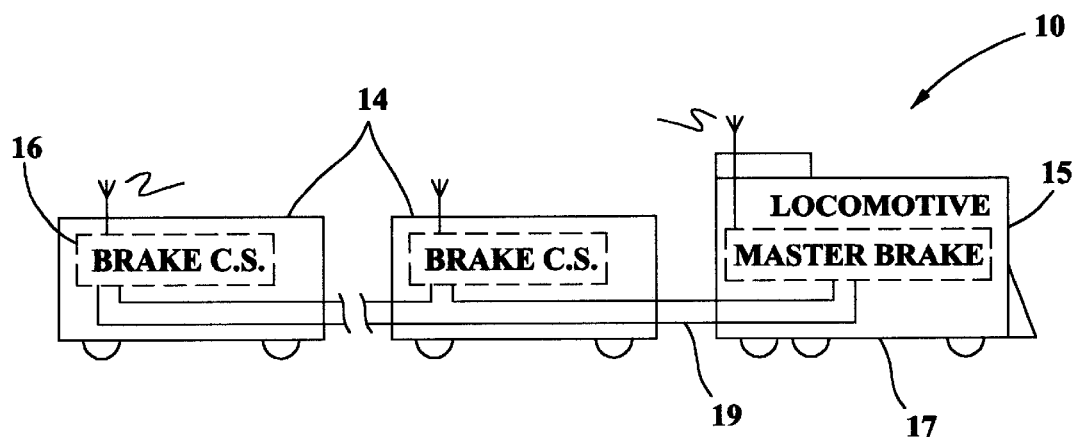
FIG. 1 is a schematic diagram of a train including the railway car brake system in accordance with the present invention.

The basic components of a railway car brake system in accordance with the present invention will now be described with reference to FIGS. 1 and 2. A train 10 includes a plurality of railcars 14 and a locomotive 15. As would readily be understood by those skilled in the art, a typical train may include several locomotives 15 and a large number of railcars 14. The brake system includes the schematically illustrated brake pipe 19 extending along the length of the train. The brake pipe 19 is used to change brake supply reservoirs 25 on the individual railcars. The brake pipe 19 may also be used to cause application of the brakes of the railcars 14, by one or a series of pressure reductions as would also be readily understood by those skilled in the art and as also explained in U.S. Pat. No. 4,553,723 the entire disclosure of which is incorporated by reference herein.

The locomotive 15 includes a master brake system controller 17 for providing a control signal to the individual railcars 14. Such a control signal could be, for example, transmitted by a radio signal to be received by a transceiver 27 of a railcar brake control system 16. In other embodiments the control signals may be transmitted by a cable extending along the train. However, such a cable would present certain difficulties, especially at the connectors between adjacent railcars 14.

Figure 2:
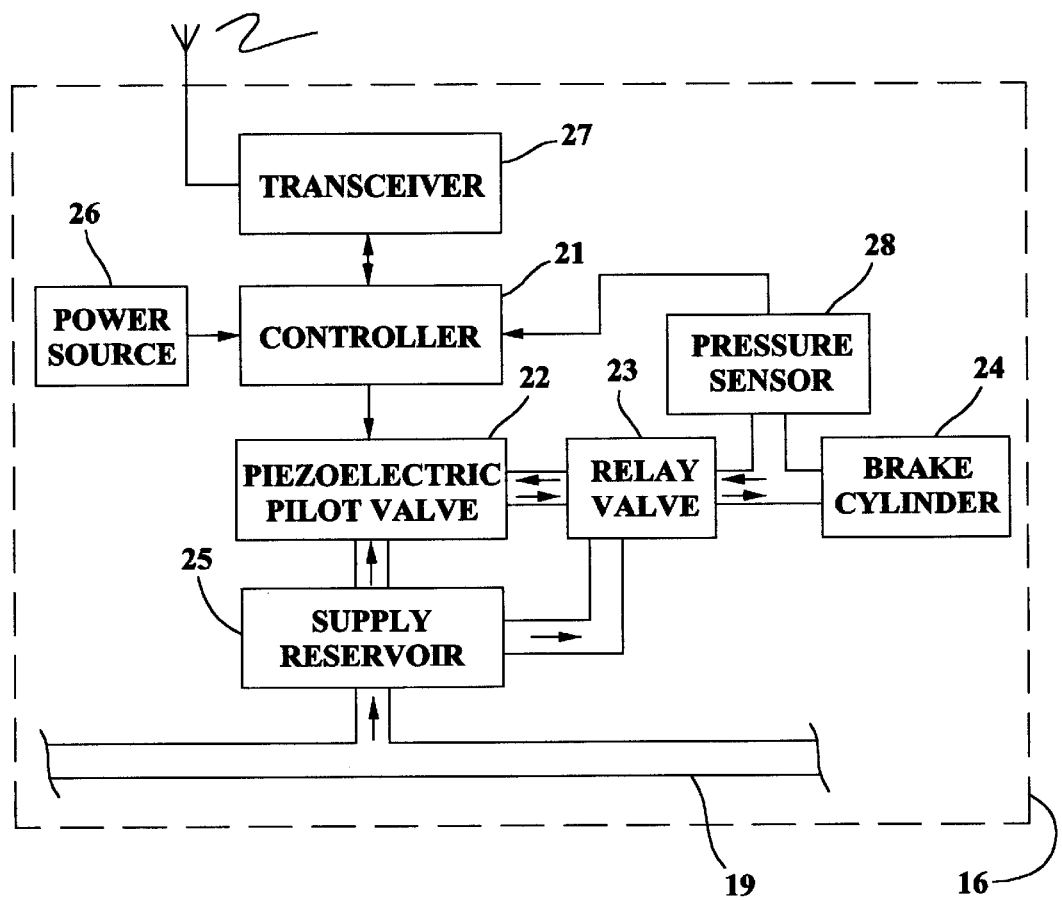
FIG. 2 is a simplified schematic diagram of a railway car brake system including a pilot valve in accordance with the present invention.

As understood with particular reference to FIG. 2, and for clarity of explanation, the railcar brake control system 16 illustrates only the major air brake related portions. The system 16 includes a controller, such as a microprocessor. The system 16 also includes a relay valve 23 connected in fluid communication with a pilot valve 22, the supply reservoir 25, and a pneumatic brake cylinder 24. The pilot valve 22 is also connected to the supply reservoir 25 and generates a pilot pressure to control the relay valve 23. The relay valve 23, in response to the pilot pressure, controls pressure in the brake cylinder 24. Although not shown here, the relay valve 23 and the pilot valve 22 may each have an exhaust port which vents to atmosphere.

Additionally, the system 16 includes an electrical power source 26 connected to the controller 21. This power source 26 could be a power generator driven by a wheel of the railcar, a battery or a combination of the two. The controller 21 may also be connected to a pressure sensor 28, in turn, connected in fluid communication with the brake cylinder 24 for generating a feedback pressure signal for the controller as will be readily appreciated by those skilled in the art.

When a brake application is requested, controller 21 controls the pilot valve 22 to pass compressed air from the supply reservoir 25 to the relay valve 23. The relay valve 23 is thereby piloted, in a well known manner, to pass compressed air from the supply reservoir 25 to the brake cylinder 24. The pressure sensor 28 provides a feedback signal to the controller 21 corresponding to brake cylinder pressure. When the desired brake cylinder pressure is reached, the pilot valve 22 and the relay valve 23 are controlled to terminate further buildup of brake cylinder pressure whereby the existing brake application condition is maintained. When a brake release is requested, controller 21 controls the pilot valve 22 to thereby cause the relay valve 22 to release the brake cylinder pressure.

Embodiments of the pilot valve 22 will now be described in greater detail while referring to the schematic illustrations of FIGS. 3–7. Each of the embodiments includes at least one bimorphic piezoelectric element which, in turn, is controlled by the controller 21 to thereby control the pilot pressure generated by the pilot valve.

Compared to solenoids, valves including bimorphic piezoelectric elements are lower profile, more reliable, consume significantly less power, and have the potential for faster response time. For example, bimorphic piezoelectric elements operate by having two independent, flat piezoelectric layers stacked on top of each other. Driving one layer to expand while contracting the other causes the actuator to bend, creating an out-of-plane motion. Although many mechanical arrangements are possible, typically a bimorphic piezoelectric element has rectangular piezoceramic layers clamped firmly at one end. Actuation occurs at the free end, away from the clamp. Additionally, bimorphic piezoelectric elements will also actuate with only one of the two layers activated.

Specifically, a bimorphic piezoelectric element bends up or down based upon an applied voltage polarity. One piezoelectric layer is driven with a positive voltage (with the poling direction), causing it to contract along the linear axis, while the other piezoelectric layer is driven with a negative voltage (against the poling direction), causing it to extend along the linear axis. This extension and contraction work together to cause the element to bend in one direction. As the polarities of the voltages are reversed, the element bends in the other direction.

The bimorphic piezoelectric element requires approximately one fifth the electrical power to generate a given force as compared with an electro-magnetic solenoid. More importantly, the power to hold the given force for bimorphic piezoelectric element is an order of magnitude less than for an electromagnetic solenoid. This is so because maintaining force with a bimorphic piezoelectric element only requires maintaining the electrical charge on the piezoelectric layers. In contrast, maintaining an electromagnetic force requires maintaining electrical current flow in the coil of an electromagnetic solenoid. Maintaining charge is extremely easy and efficient, while maintaining current flow requires continuous power input due to the resistive power loss in the coil.

Figure 3:
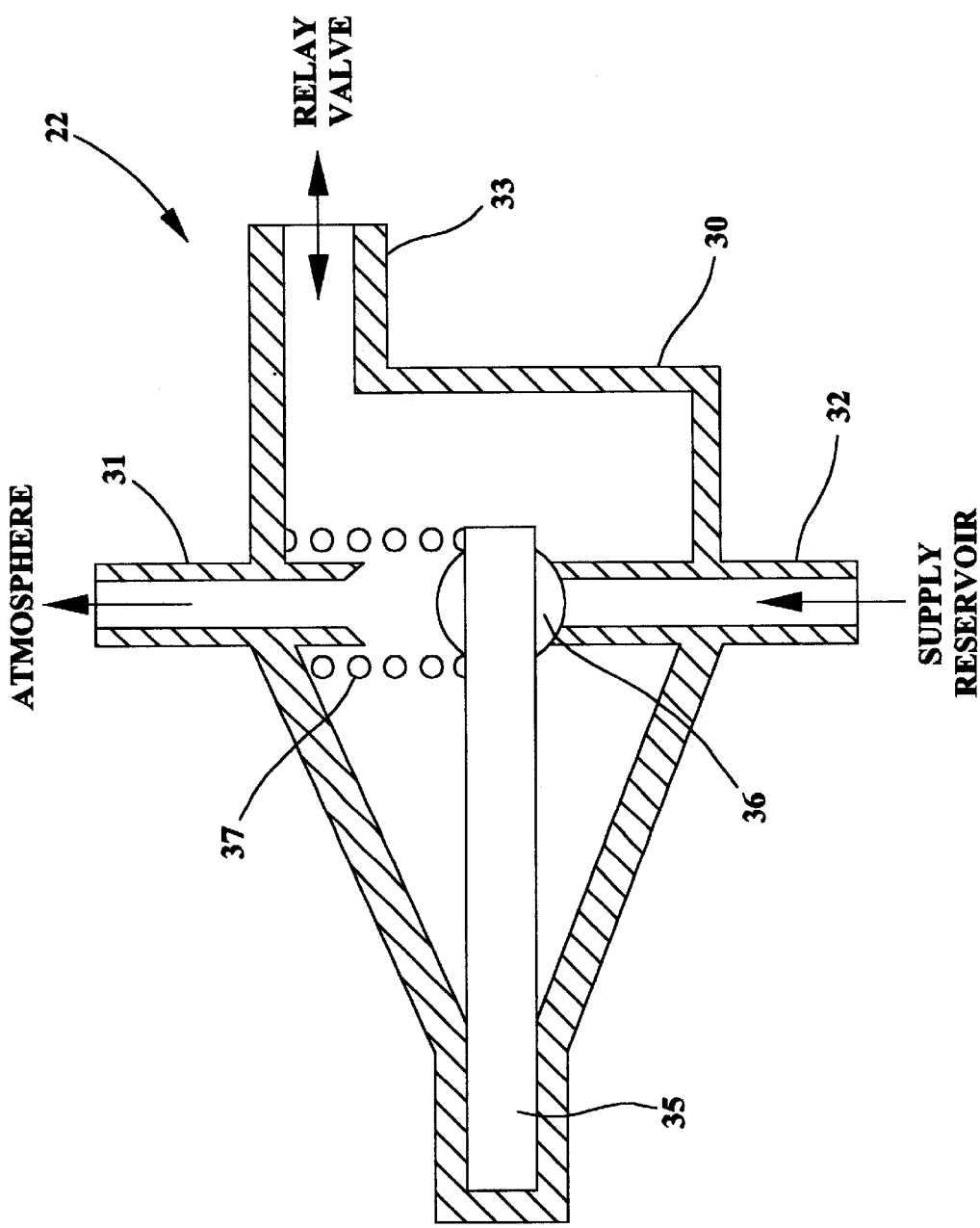
FIG. 3 is a schematic cross-sectional view of a pilot valve embodiment for the railway car brake system of FIG. 2, and illustrating a single bimorphic piezoelectric element contained in a valve body in accordance with one embodiment of the present invention.

Referring now to the particular embodiment of FIG. 3, the illustrated pilot valve 22 includes a valve body 30 having a first port 33 connected to the relay valve 23, a second port 32 connected to the supply reservoir 25, and a third port 31 connected to atmosphere. The pilot valve 22 further includes a piezoelectric element 35 which controls fluid flow from the supply reservoir 25, through the second port 32, and to the relay valve 23 through the first port 33. The piezoelectric element 35 includes a pair of sealing portions 36 for sealing the second port 32 to cut off the flow of compressed air from the supply reservoir 25, or to seal the third port 31 to cut off the flow of air to atmosphere. Furthermore, a biasing device, such as a spring 37, is provided to bias the piezoelectric element 35 to a blocking position in which the flow of compressed air from the supply reservoir 25 is cut off.

When a charge is applied from the controller 21 to the piezoelectric element 35, the piezoelectric element 35 bends to a position which permits the flow of compressed air from the supply reservoir 25 to the relay valve 23. Pilot pressure is only conducted to the relay valve 23 when the piezoelectric element 35 is charged. Therefore, this pilot valve embodiment releases braking upon a loss of power to the piezoelectric element 35 and thereby provides a failsafe release of braking.

Figure 4:
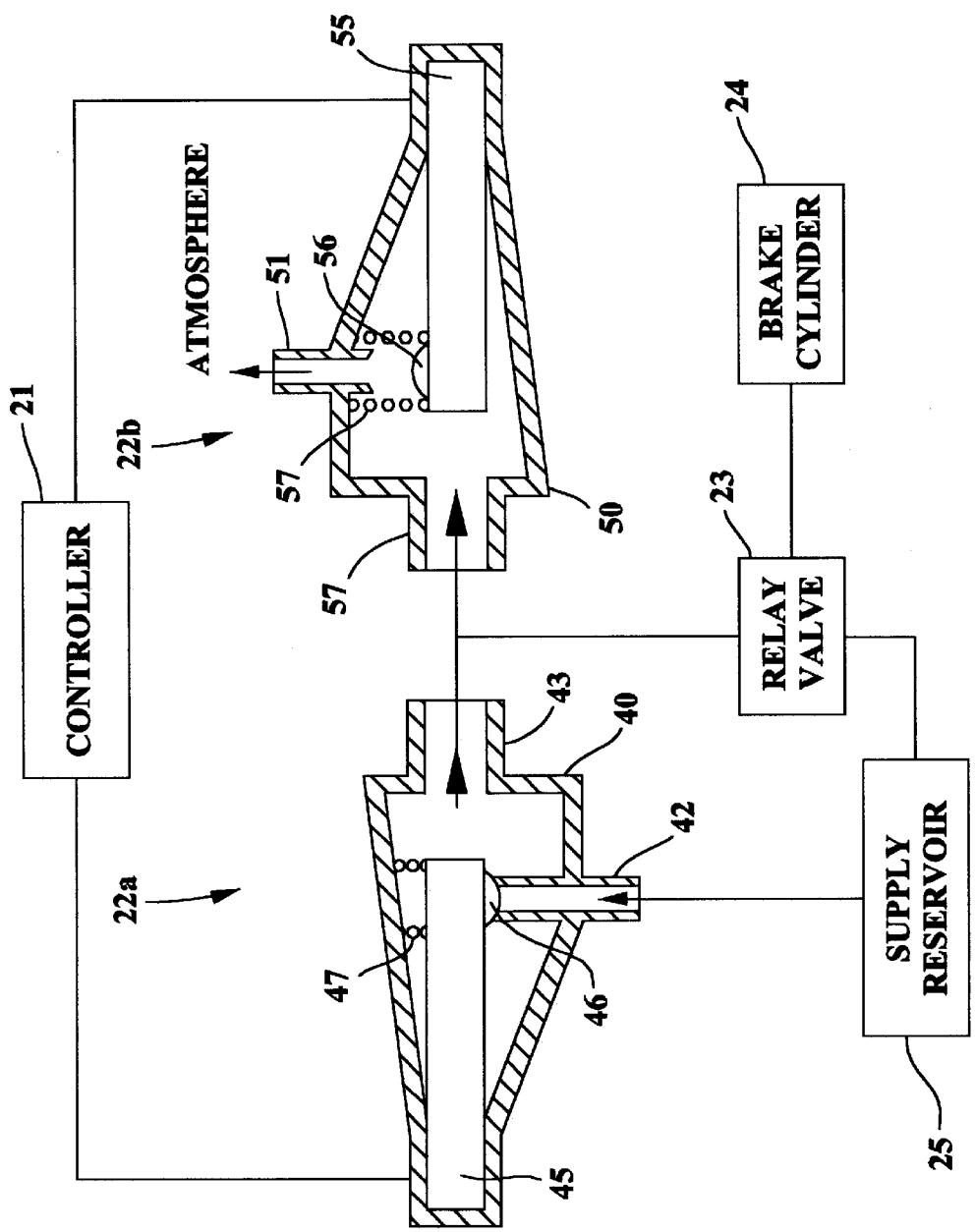
FIG. 4 is schematic cross-sectional view of a pair of pilot valves for the railway car brake system of FIG. 2, and illustrating first and second bimorphic piezoelectric elements each contained in a separate valve body in accordance with another embodiment of the present invention.

FIG. 4 illustrates another embodiment wherein two pilot valves 22a and 22b are provided including respective first and second valve bodies 40 and 50. The first valve body 40 includes a first port 43 connected to the relay valve 23 and a second port 42 connected to the supply reservoir 25. The pilot valve 22a further includes a first piezoelectric element 45 which controls fluid flow from the supply reservoir 25 through the second port 42 and to the relay valve 23 through the first port 43. The piezoelectric element 45 illustratively includes a sealing portion 46 for sealing the second port 42 to cut off the flow of compressed air from the supply reservoir 25. Again, a biasing device in the form of a spring 47, for example, is provided for biasing the piezoelectric element 45 to a blocking position in which the flow of compressed air from the supply reservoir 25 is cut off.

The second valve body 50 includes a third port 51 connected to atmosphere and a fourth port 53 connected to the relay valve 23. The pilot valve 22b further includes a second piezoelectric element 55 which controls fluid flow from the relay valve 23 through the fourth port 53 to atmosphere through the third port 51. The piezoelectric element 55 includes a sealing portion 56 for sealing the third port 51 to cut off the flow of air to atmosphere. A spring 57 biases the piezoelectric element 55 to a position in which the flow of air to atmosphere is permitted.

When charge is applied from the controller 21 to the piezoelectric element 45, it bends to a position which permits the flow of compressed air from the supply reservoir 25 through the first port 43. When charge is applied to piezoelectric element 55, it bends to a position which seals the third port 51 and cuts off the flow of air to atmosphere. Pressure, from the supply reservoir 25 only passes to the relay valve 23 when the both piezoelectric elements 45 and 55 are charged. Therefore, this pilot valve embodiment also releases braking upon a loss of power to the piezoelectric elements 45 and 55 and thereby provides a failsafe release of braking.

Figure 5:
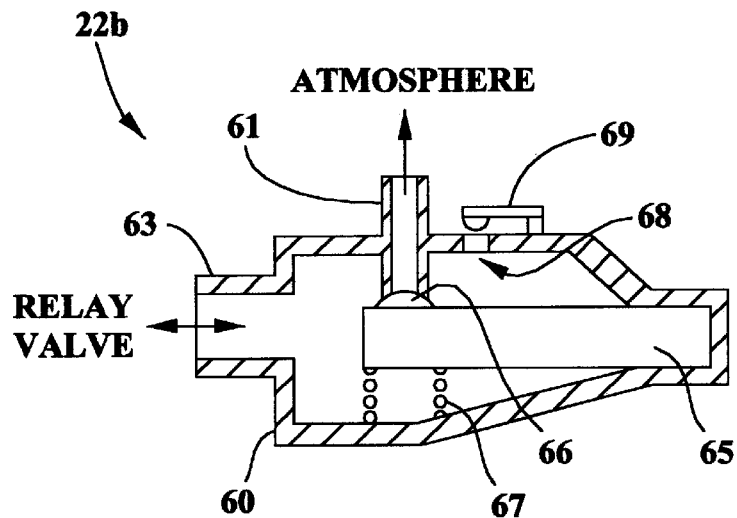
FIG. 5 is a schematic cross-sectional view of a pilot valve variation for the railway car brake system of FIG. 4, and illustrating a third bimorphic piezoelectric element.

Additionally, the second pilot valve 22b, as shown in FIG. 4, may be modified as shown in FIG. 5. Here, the valve body 60 includes a third port 61 connected to atmosphere and a fourth port 63 connected to the relay valve 23. The second piezoelectric element 65 controls fluid flow from the relay valve 23 through the fourth port 63 to atmosphere through the third port 61. The piezoelectric element 65 includes a sealing portion 66 for sealing the third port 61 to cut off the flow of air to atmosphere. A biasing device or spring 67 biases the piezoelectric element 65 to a blocking position in which the flow of air to atmosphere is cut off. This second valve body 60 includes a fifth port 68 which vents to atmosphere. In addition, a third piezoelectric element 69 is positioned to seal the fifth port 68. This third piezoelectric element 69 is substantially smaller than the first and second piezoelectric elements 45 and 65 so as to consume relatively less power.

When charge is applied from the controller 21 to the piezoelectric element 65, it bends to a position which opens the third port 61 and permits the flow of air to atmosphere. Pressure is passed to the relay valve 23 when the piezoelectric element 45 is powered and the piezoelectric element 65 is not powered. During a loss of power to the piezoelectric elements 45 and 65, the existing brake cylinder pressure would otherwise be maintained; however, the third piezoelectric element 69 maintains an open position when not powered. Therefore, this pilot valve embodiment also releases braking upon a loss of power to the piezoelectric elements 45, 65 and 69 and thereby provides a failsafe release of braking. The advantage here is that the relatively smaller third piezoelectric element 69 requires much less power to hold the existing pilot pressure than the piezoelectric element 65. Accordingly, during a long duration of braking, the electrical power draw is minimized.

Figure 6:
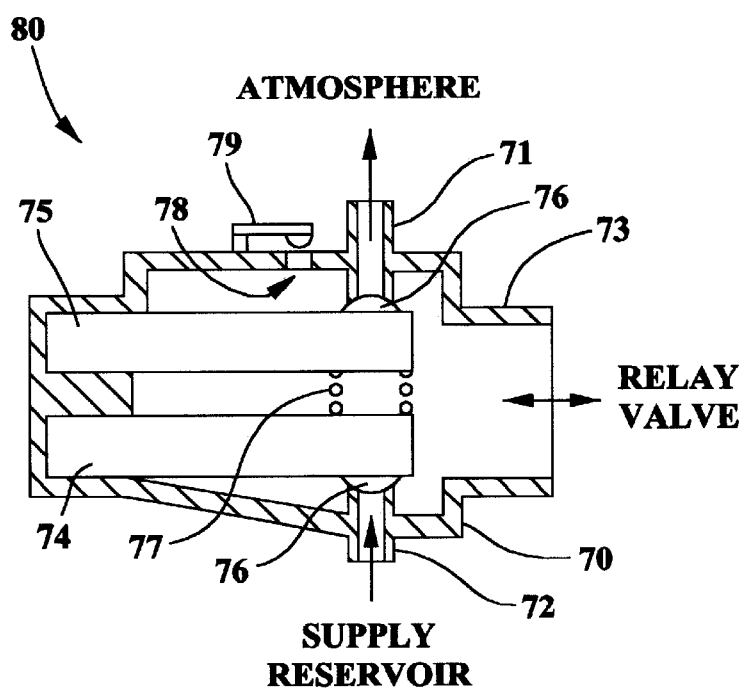
FIG. 6 is a schematic cross-sectional view of a pilot valve for the railway car brake system of FIG. 2, and illustrating first, second and third piezoelectric bimorphic elements associated with a common valve body in accordance with yet another embodiment of the present invention.

Referring now to the particular embodiment of FIG. 6, the pilot valve 80 includes a common valve body 70 having a first port 73 connected to the relay valve 23, a second port 72 connected to the supply reservoir 25, and a third port 71 connected to atmosphere. The pilot valve 22 includes a first piezoelectric element 74 which controls fluid flow from the supply reservoir 25 through the second port 72 and to the relay valve 23 through the first port 73. Additionally, a second piezoelectric element 75 is provided to control fluid flow from the relay valve 23 through the first port 73 to atmosphere through the third port 71. The piezoelectric elements 74 and 75 include respective sealing portions 76 for sealing the respective ports. Again, a biasing device or spring 77 is provided for biasing the piezoelectric elements 74 and 75 to blocking positions in which the flow of compressed air from the supply reservoir 25 is cut off, and the flow of air to atmosphere is cut off, respectively.

Additionally, the valve body 70 includes a fourth port 78 which vents to atmosphere, and a third piezoelectric element 79 to seal the fourth port 78, similar to the embodiment as described above with reference to FIG. 4. In the embodiment of FIG. 6, the common valve body 70 houses both piezoelectric elements 74 and 75, as well as provides the ports 71, 72 and 73 as will be appreciated by those skilled in the art. Like the third piezoelectric element 69 in the embodiment shown in FIG. 4, this third piezoelectric element 79 is substantially smaller than the first and second piezoelectric elements 74 and 75 and so consumes relatively less power.

When charge is applied to piezoelectric element 75, it bends to a position which opens the third port 71 and permits the flow of air to atmosphere. Thus, pressure is passed to the relay valve 23 when the first piezoelectric element 74 is powered and the second piezoelectric element 75 is not powered. During a loss of power to the piezoelectric elements 74 and 75, the existing brake cylinder pressure would otherwise be maintained; however, the third piezoelectric element 79 maintains an open position when not charged. In other words, this pilot valve 22 embodiment also releases braking upon a loss of power to the piezoelectric elements 74, 75 and 79 and thereby provides a failsafe release of braking.

Figure 7:
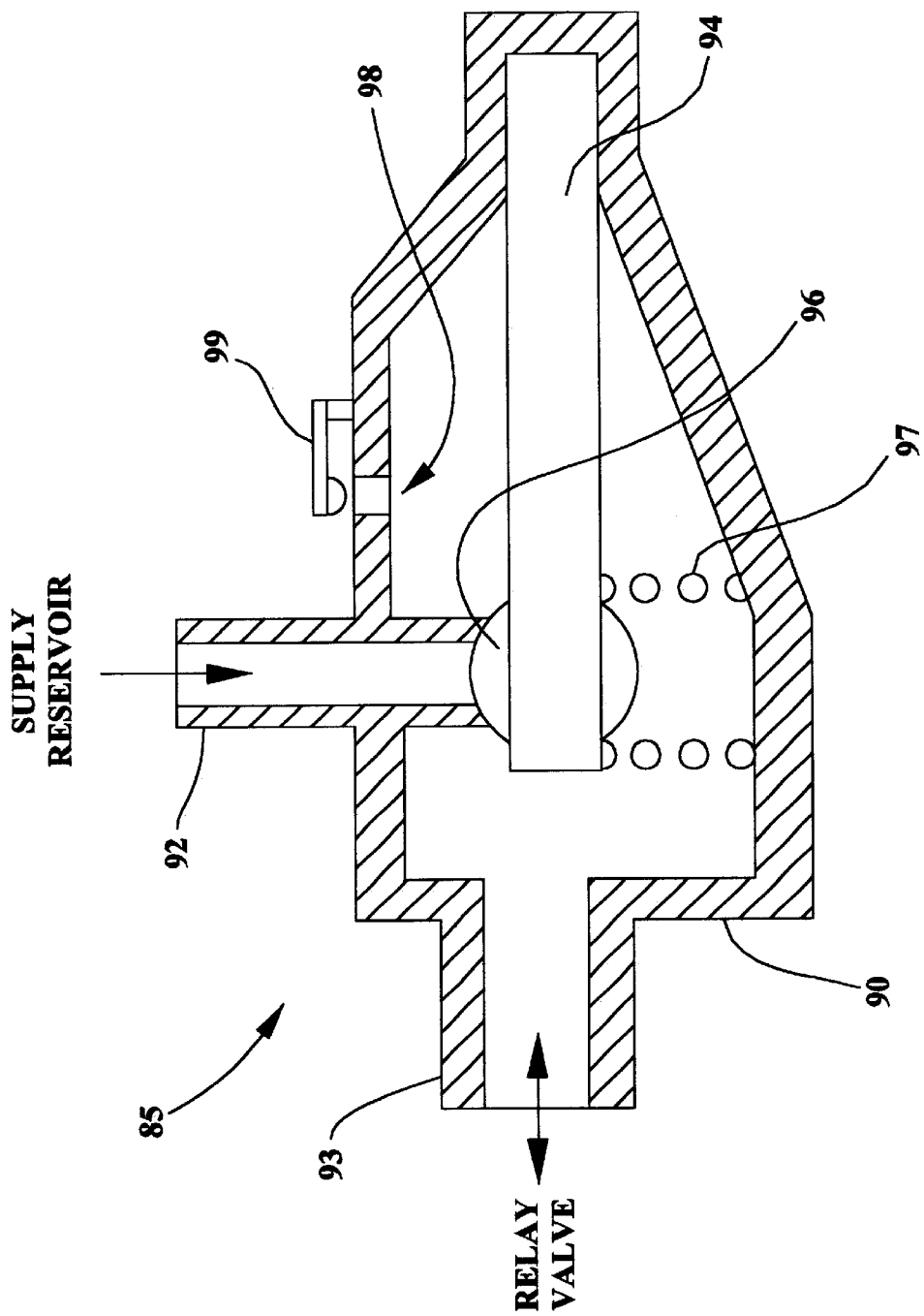
FIG. 7 is a schematic cross-sectional view of yet another embodiment of a pilot valve for a railway car brake system in accordance with the present invention.

Turning now additionally to FIG. 7, another embodiment of a pilot valve 85 is now described. Here the valve body 80 includes a port 92 connected to the supply reservoir and a port 93 connected to the relay valve 23. The piezoelectric element 94 controls fluid flow from the supply reservoir to the relay valve 23 via the ports 92, 93. The piezoelectric element 94 includes a sealing portion 96 for sealing the port 92 to cut off the flow of air from the supply reservoir. A biasing device or spring 97 biases the piezoelectric element 94 to a blocking position in which the flow of air from the supply reservoir to the relay valve is cut off.

The valve body 90 includes a port 98 which vents to atmosphere. In addition, a piezoelectric element 99 is positioned to seal the port 98. This piezoelectric element 99 is substantially smaller than the piezoelectric element 94 so as to consume relatively less power. When a charge is applied from the controller 21 to the piezoelectric element 94, it bends to a position which opens the port 92 and permits the flow of air from the supply reservoir to the interior of the valve body 90. Pressure is passed to the relay valve 23 when the piezoelectric element 94 is powered and the piezoelectric element 99 is also powered to block port 98. During a loss of power to the piezoelectric elements 94 and 99, the piezoelectric element 99 maintains an open position. Therefore, this embodiment of the pilot valve 85 also releases braking upon a loss of power to the piezoelectric elements 94 and 99 and thereby provides a failsafe release of braking. The advantage here is that the relatively smaller piezoelectric element 99 requires much less power to hold the existing pilot pressure than a piezoelectric element, such as piezoelectric element 94. Accordingly, during a long duration of braking, the electrical power draw is minimized.

The pilot valve embodiments 22b, 80 and 85 including the relatively small piezoelectric element 69, 79 and 99 coupled to a port 68, 78 and 98 on the valve body 60, 70 and 90 may also be used in industrial applications other than railway braking as will be readily understood by those skilled in the art. The relatively small piezoelectric element 69, 79 and 99 can be used to provide a failsafe venting upon loss of power for any of a number of applications. In other words, the invention is also directed to valve comprising a valve body having input, output and vent ports; at least one first piezoelectric element for controlling fluid flow between the input and output ports; and at least one second piezoelectric element for controlling fluid flow from the valve body through the vent port. Of course, the at least one second piezoelectric element may permit fluid flow through the vent port responsive to a loss of power thereto. In addition, the at least one second piezoelectric element may be substantially smaller than the at least one first piezoelectric elements so as to consume relatively less power.

According to a method aspect of the invention, steps are provided for railway car braking. These steps include generating a pilot pressure using at least one piezoelectric element 35, and controlling pressure in at least one pneumatic brake cylinder 24 in response to the pilot pressure. The piezoelectric element is contained in at least one pilot valve body 30, for example, which is opened to atmosphere upon loss of power to the piezoelectric element 35 to thereby provide a failsafe release of braking. Additionally, fluid flow from a pressure source, such as the supply reservoir 25, to a relay valve 23 can be controlled with a first piezoelectric element 45 or 74, and fluid flow from the relay valve 23 to atmosphere can be controlled with a second piezoelectric element 55, 65 or 75.

The method further includes the steps of energizing the first and second piezoelectric elements to open respective fluid flows, and de-energizing the first and second piezoelectric elements to block respective fluid flows. The first and second piezoelectric elements may also be biased to block respective fluid flows.

Another aspect of the method includes the step of operating a third piezoelectric element 69 or 79, which consumes less power than the first and second piezoelectric elements, to control fluid flow to atmosphere and provide for failsafe breaking. Moreover, a pressure signal can be generated from a pressure sensor 28 for use in controlling pressure in the pneumatic brake cylinder.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A railway car brake system comprising:
   at least one pneumatic brake cylinder;
   a relay valve for controlling pressure in the at least one brake cylinder responsive to a pilot pressure;
   at least one pilot valve connected to said relay valve for controlling the pilot pressure, said at least one pilot valve comprising at least one piezoelectric element; and
   a controller connected to said at least one piezoelectric element for controlling the pilot pressure to thereby control braking.

2. A railway car brake system according to claim 1 wherein said at least one pilot valve releases braking upon loss of power to said at least one piezoelectric element to thereby provide a failsafe release of braking.

3. A railway car brake system according to claim 1 wherein said at least one pilot valve comprises:
   a first piezoelectric element for controlling fluid flow from a pressure source to said relay valve; and
   a second piezoelectric element for controlling fluid flow from the relay valve to atmosphere.

4. A railway car brake system according to claim 3 wherein said first and second piezoelectric elements each have energized and de-energized states; and wherein said first and second piezoelectric elements are in blocking positions to block respective fluid flows when in the de-energized state.

5. A railway car brake system according to claim 4 wherein said at least one pilot valve further comprises at least one biasing device for biasing said first and second piezoelectric elements to the blocking positions.

6. A railway car brake system according to claim 3 further comprising a common valve body containing said first and second piezoelectric elements; and wherein said common valve body comprises a first port connected to said relay valve, a second port connected to the pressure source, and a third port connected to atmosphere.

7. A railway car brake system according to claim 6 wherein said valve body further comprises a fourth port connected to atmosphere; and further comprising a third piezoelectric element for controlling fluid flow from within said valve body through said fourth port to atmosphere.

8. A railway car brake system according to claim 7 wherein said third piezoelectric element is substantially smaller than each of said first and second piezoelectric elements so as to consume relatively less power.

9. A railway car brake system according to claim 8 wherein said third piezoelectric element has energized and de-energized states; and wherein said third piezoelectric element is in an open position to permit fluid flow from said relay valve, through said valve body and to atmosphere when in the de-energized state to thereby provide a failsafe release of braking.

10. A railway car brake system according to claim 3 wherein said at least one pilot valve comprises first and second pilot valves including respective first and second valve bodies which contain respective first and second piezoelectric elements.

11. A railway car brake system according to claim 10 wherein said first pilot valve is a normally closed valve and said first valve body comprises a first port connected to said relay valve and a second port connected to the pressure source, and wherein said second pilot valve is a normally open valve and said second valve body comprises a third port connected to atmosphere and a fourth port connected to said relay valve.

12. A railway car brake system according to claim 10 wherein said first pilot valve is a normally closed valve and said first valve body comprises a first port connected to said relay valve and a second port connected to the pressure source; wherein said second pilot valve is a normally closed valve and said second valve body comprises a third port connected to atmosphere, a fourth port connected to said relay valve, and a fifth port connected to atmosphere; and wherein said second pilot valve further comprises a third piezoelectric element for controlling fluid flow from within said second valve body through said fourth port to atmosphere.

13. A railway car brake system according to claim 12 wherein said third piezoelectric element is substantially smaller than each of said first and second piezoelectric elements so as to consume relatively less power.

14. A railway car brake system according to claim 13 wherein said second piezoelectric element is substantially smaller than said first piezoelectric elements so as to consume relatively less power.

15. A railway car brake system according to claim 13 wherein said second piezoelectric element has energized and de-energized states; and wherein said second piezoelectric element is in an open position to permit fluid flow from said relay valve, through said valve body and to atmosphere when in the de-energized state to thereby provide a failsafe release of braking.

16. A railway car brake system according to claim 3 wherein said at least one pilot valve further comprises:
   a valve body having first, second and third ports, a first port connected to said relay valve, a second port connected to the pressure source, and a third port connected to atmosphere;
   wherein the first piezoelectric element is contained in said valve body for controlling fluid flow from the second port to the first port; and
   wherein the second piezoelectric element is associated with the third port for controlling fluid flow from within said valve body through the third port to atmosphere.

17. A railway car brake system according to claim 1 wherein said at least one piezoelectric element comprises a bimorphic piezoelectric element having an energized position and a de-energized position.

18. A railway car brake system according to claim 1 further comprising a radio transceiver connected to said controller.

19. A railway car brake system according to claim 1 further comprising at least one pressure transducer connected in fluid communication with the brake cylinder for generating a pressure signal for said controller.

20. A railway car brake system according to claim 1 further comprising at least one of a generator and a battery connected to said controller for providing power thereto.

21. A railway car brake system comprising:
at least one pneumatic brake cylinder;
a relay valve for controlling pressure in the at least one brake cylinder responsive to a pilot pressure;
at least one pilot valve connected to said relay valve for controlling the pilot pressure, said at least one pilot valve comprising first and second piezoelectric elements for controlling fluid flow from a pressure source to said relay valve and for controlling fluid flow from the relay valve to atmosphere, said at least one pilot valve releasing braking upon loss of power thereto to thereby provide a failsafe release of braking; and
a controller connected to said at least one piezoelectric element for controlling the pilot pressure to thereby control braking.

22. A railway car brake system according to claim 21 wherein said first and second piezoelectric elements each have energized and de-energized states; wherein said first and second piezoelectric elements are in blocking positions to block respective fluid flows when in the de-energized state; and wherein said at least one pilot valve further comprises at least one biasing device for biasing the piezoelectric elements to the blocking position.

23. A railway car brake system according to claim 21 further comprising a common valve body containing said first and second piezoelectric elements; and wherein said common valve body comprises a first port connected to said relay valve, a second port connected to the pressure source, and a third port connected to atmosphere.

24. A railway car brake system according to claim 23 wherein said valve body further comprises a fourth port connected to atmosphere; and further comprising a third piezoelectric element which is substantially smaller than each of said first and second piezoelectric elements, for controlling fluid flow from within said valve body through said fourth port to atmosphere.

25. A railway car brake system according to claim 24 wherein said third piezoelectric element has energized and de-energized states; and wherein said third piezoelectric element is in an open position to permit fluid flow from said relay valve, through said valve body and to atmosphere when in the de-energized state to thereby provide a failsafe release of braking.

26. A railway car brake system according to claim 21 wherein said at least one pilot valve further comprises:
a valve body having first, second and third ports, a first port connected to said relay valve, a second port connected to the pressure source, and a third port connected to atmosphere;
wherein the first piezoelectric element is contained in said valve body for controlling fluid flow from the second port to the first port; and
wherein the second piezoelectric element is associated with the third port for controlling fluid flow from within said valve body through the third port to atmosphere.

27. A railway car brake system according to claim 26 wherein said second piezoelectric element has energized and de-energized states; and wherein said second piezoelectric element is in an open position to permit fluid flow from said relay valve, through said valve body and to atmosphere when in the de-energized state to thereby provide a failsafe release of braking.

28. A railway car brake system according to claim 21 wherein each of said first and second piezoelectric element comprises a bimorphic piezoelectric element having an energized position and a de-energized position.

29. A railway car brake system according to claim 21 further comprising at least one pressure transducer connected in fluid communication with the brake cylinder for generating a pressure signal for said controller.

30. A control system for a railway car brake system 112 comprising at least one pneumatic brake cylinder and a relay valve for controlling pressure in the at least one brake cylinder responsive to a pilot pressure, the control system comprising:
at least one pilot valve for controlling the pilot pressure, and comprising at least one piezoelectric element; and
a controller connected to said at least one piezoelectric element for controlling the pilot pressure by the at least one pilot valve.

31. A control system according to claim 30 wherein said at least one pilot valve opens to atmosphere upon loss of power to said at least one piezoelectric element to thereby provide a failsafe release of braking.

32. A control system according to claim 30 wherein said at least one piezoelectric element comprises a bimorphic piezoelectric element having an energized position and a de-energized position.

33. A control system according to claim 30 further comprising a radio transceiver connected to said controller.

34. A control system according to claim 30 further comprising at least one pressure transducer for connection with the brake cylinder for generating a pressure signal for said controller.

35. A method for railway car braking comprising the steps of:
controlling a pilot pressure using at least one piezoelectric element; and
controlling pressure in at least one pneumatic brake cylinder in response to the pilot pressure.

36. A method for railway car braking according to claim 35, wherein the at least one piezoelectric element is contained in at least one pilot valve body, and further comprising the step of opening the at least one pilot valve body to atmosphere upon loss of power to the at least one piezoelectric element to thereby provide a failsafe release of braking.

37. A method for railway car braking according to claim 35 wherein the step of operating at least one piezoelectric element further comprises the steps of:
controlling fluid flow from a pressure source to a relay valve with a first piezoelectric element; and
controlling fluid flow from the relay valve to atmosphere with a second piezoelectric element.

38. A method for railway car braking according to claim 35 wherein the at least one piezoelectric element comprises a bimorphic piezoelectric element having an energized position and a de-energized position.

39. A method for railway car braking according to claim 35, further comprising the step of generating a pressure signal for use in controlling pressure in the at least one pneumatic brake cylinder.

40. A railway car brake system comprising:

at least one pneumatic brake cylinder;

a relay valve for controlling pressure in the at least one brake cylinder responsive to a pilot pressure;

at least one pilot valve connected to said relay valve comprising at least one piezoelectric element, said at least one pilot valve releasing braking upon loss of power to said at least one piezoelectric element; and a controller connected to said at least one piezoelectric element for controlling the pilot pressure to thereby control braking.

41. A railway car brake system according to claim 40 wherein said at least one piezoelectric element comprises a bimorphic piezoelectric element having an energized position and a de-energized position.

* * * * *

UNITED STATES PATENT AND TRADEMARK OFFICE
CERTIFICATE OF CORRECTION

PATENT NO.    : 6,302,495 B1
DATED         : October 16, 2001
INVENTOR(S)   : David Peltz It is certified that error appears in the above-identified patent and that said Letters Patent is hereby corrected as shown below:

<u>Column 12,</u>
Line 10, delete "112".

Signed and Sealed this

Tenth Day of June, 2003

JAMES E. ROGAN
*Director of the United States Patent and Trademark Office*